US008135615B2

(12) United States Patent
Bradley et al.

(10) Patent No.: US 8,135,615 B2
(45) Date of Patent: Mar. 13, 2012

(54) SYSTEMS AND METHODS FOR DETECTING CLICK FRAUD

(75) Inventors: Keith Joseph Bradley, Sandyford (IE); Paul Cotter, Stillorgan (IE); Damien Plower, Clonsilla (IE); Juraj Šofranko, Kežmarok (SK)

(73) Assignee: Amdocs Software Systems Limited, Dublin (IE)

( * ) Notice: Subject to any disclaimer, the term of this patent is extended or adjusted under 35 U.S.C. 154(b) by 1056 days.

(21) Appl. No.: 12/002,576

(22) Filed: Dec. 18, 2007

(65) Prior Publication Data

US 2009/0157417 A1    Jun. 18, 2009

(51) Int. Cl.
*G06Q 30/00*    (2006.01)

(52) U.S. Cl. ............................................. 705/14; 705/26
(58) Field of Classification Search .................... None
See application file for complete search history.

(56) References Cited

U.S. PATENT DOCUMENTS

| 5,867,799 | A | 2/1999 | Lang et al. |
|---|---|---|---|
| 5,983,214 | A | 11/1999 | Lang et al. |
| 7,028,261 | B2 | 4/2006 | Smyth et al. |
| 7,779,121 | B2 * | 8/2010 | Salo et al. ..................... 709/224 |
| 7,822,631 | B1 * | 10/2010 | Vander Mey et al. ........ 705/7.29 |
| 2003/0065706 | A1 | 4/2003 | Smyth et al. |
| 2006/0053090 | A1 | 3/2006 | Cotter et al. |
| 2006/0085408 | A1 * | 4/2006 | Morsa ................................ 707/3 |
| 2006/0212350 | A1 * | 9/2006 | Ellis et al. ........................ 705/14 |
| 2007/0061211 | A1 * | 3/2007 | Ramer et al. .................... 705/25 |
| 2007/0143128 | A1 * | 6/2007 | Tokarev et al. ................... 705/1 |
| 2007/0255821 | A1 * | 11/2007 | Ge et al. ......................... 709/224 |
| 2008/0114624 | A1 * | 5/2008 | Kitts ................................ 705/7 |
| 2009/0210444 | A1 * | 8/2009 | Bailey et al. ............. 707/103 R |

OTHER PUBLICATIONS

Advisory/ Industry Experts Explore Latest Developments in Click Fraud Debate at ad:tech San Francisco 2006, Business Wire, Apr. 21, 2006.*
Indepent Enterprise—Class Click fraud Detection Service Monitors Online Search Advertising Campaigns of More than 100,000 clicks, Business Wire, Apr. 26, 2006.*
International Preliminary Report on Patentability and Written Opinion from PCT Application No. PCT/EP2008/010858 issued on Jun. 22, 2010.
International Search Report from International Application No. PCT/EP2008/010858, dated Jun. 17, 2009.

* cited by examiner

*Primary Examiner* — Rajesh Khattar
*Assistant Examiner* — Carol See
(74) *Attorney, Agent, or Firm* — Zilka-Kotab, PC

(57) ABSTRACT

A method for detecting click fraud. In one embodiment, the method includes the steps of: directing a user to an item but delaying the internal ratings update of the item; collecting data to build a model of the user; building the model of the user in response to the collected data; determining the trustworthiness of the user in response to the model of the user; and updating internal ratings of the item in response to the trustworthiness of the user. In various embodiments, the click fraud can be the inflation of advertisement clicks, the inflation of popularity or the inflation of reputation.

39 Claims, 4 Drawing Sheets

SYSTEMS AND METHODS FOR DETECTING CLICK FRAUD

FIELD OF THE INVENTION

The invention relates to the field of click fraud detection. Specifically, the invention relates to systems and methods for identifying fraudulent clicks by users of a web based system and preventing these fraudulent clicks from influencing the content and recommendations of other users.

BACKGROUND OF THE INVENTION

Click fraud is a type of internet crime that occurs in pay-per-click online advertising when a person, automated script, or computer program, imitating a legitimate user of a web browser, clicks on an advertisement on a web page, for the purpose of generating a charge per click to the advertiser without having actual interest in the targeted advertisement. Click fraud has been the subject of increasing number of controversies and litigations due to the growing roles of the internet as an advertising platform, a market place and an information repository.

Advertisement is one type of content that is most susceptible to click fraud. Inflated stats on advertisements can hurt revenue for ad providers because the ad providers are forced to overpay for their advertising as a result of competitors artificially boosting the number of clicks on their advertisements. E-commence websites also suffer from click fraud in terms of buyer and seller reputations. A loss of confidence in the trust system provided by an e-marketplace will lead to diminished user satisfaction and ultimately reduced revenue for the operator of the website. Click fraud can also cause a decrease in the quality of service provided by online rating systems that recommend content or other websites to its users. If the ratings of the content items are artificially manipulated as a result of click fraud, the recommendation made based on those ratings will no longer be accurate. This leads to reduced click through on content items, loss of user confidence in the service and, ultimately, financial losses to the service provider.

Currently, there are a number of click fraud prevention solutions offered by different companies. For example, Ad Watcher offers a suite of click fraud monitoring tools that help detect and prevent fraudulent activity. Click Forensics combines the technical, behavioral and market attributes of an advertiser's online campaigns to monitor and detect click fraud. Authentic Click identifies, verifies and documents sources of fraud, and calculates the amount of advertising dollars spent on invalid clicks to be refunded to advertisers. Click Lab provides click fraud audits for advertisers and publishers. Finally, Think Partnership allows advertisers to bid on click-fraud protected keywords.

These existing click fraud solutions are primarily customized for advertising and publishing companies. The mechanisms used by these solutions include detecting the occurrences of one or more of the following signs of click fraud: abnormal number of clicks from the same IP address, a sudden increase in the number of visitors from countries to which the advertisement is not targeted to; visitors who leave the site too quickly; a sudden increase in activity for specific keyword in an ad campaign for no apparent reason, and an unusual increase in website traffic.

The problems with these existing approaches are that they rely on identifying and blocking dangerous IP addresses. Invariably, this happens after the fact that the clicks have already been recorded and content or recommendation systems already contaminated and does not protect a service from future abuse. These systems also fail to take into account consumer intelligence such as user profiles and are unable to identify suspicious users until these users have already successfully committed click fraud. The present invention provides a solution to overcome these shortcomings of the existing systems.

SUMMARY OF THE INVENTION

In one aspect, the invention relates to a method for detecting click fraud. In one embodiment, the method includes the steps of: directing a user to an item on a website but delaying the update of the internal ratings of the item; collecting data to build a model of the user; building the model of the user in response to the collected data; determining the trustworthiness of the user in response to the model of the user; and updating internal ratings of the item in response to the trustworthiness of the user. In various embodiments, the click fraud can be the inflation of advertisement clicks, popularity or reputation. In another embodiment, the user is identified by a unique ID associated with the user. In another embodiment, the step of collecting data to build a model of the user further includes collecting data selected from the group of: user contract score, identical profile score, purchase history score, registered user score, user voice calls score, valid user phone number, user gateway score, user agent score, user hit time ratio, and UCP age score. In yet another embodiment, the step of building the model of the user includes calculating a user trust score using the following formula:

$$\begin{aligned} \text{User Trust Score} = \\ (A * \text{User Contract Score}) * (B * \text{Identical Profile Score}) * \\ (C * \text{Purchase History Score}) * (D * \text{Registered User Score}) * \\ (E * \text{User Voice Calls}) * (F * \text{Valid User Phone Number}) * \\ (G * \text{User Gateway Score}) * (H * \text{User Agent Score}) * \\ (I * \text{User Hit Time Ratio}) * (J * \text{UCP Age Score}) \end{aligned}$$

wherein A, B, C, D, E, F, G, H, I and J represent the relative importance of User Contract Score, Identical Profile Score, Purchase History Score, Registered User Score, User Voice Calls Score, Valid User Phone Number, User Gateway Score, User Agent Score, User Hit Time Ratio and UCP Age Score, respectively.

In another embodiment, another method for detecting click fraud is provided. The method includes the steps of: detecting an action of a user on an item; and withholding the updating of the internal rating associated with the item in response to the action until the user is determined to be trustworthy. In another embodiment, the method further includes the steps of: collecting data to build a model of the user; building the model of the user in response to the collected data; and determining the trustworthiness of the user in response to the model of the user. In yet another embodiment, the method further includes the step of obtaining approval from at least one other trustworthy user before updating the internal rating associated with the item in response to the action.

In yet another embodiment, still another method for detecting click fraud is provided. The method includes the steps of: detecting a user request for an item; approving the item for an internal rating; withholding updating the internal rating associated with the item in response to the user request until the user is determined to be trustworthy. In another embodiment, the method further includes the steps of: collecting data to build a model of the user; building the model of the user in response to the collected data; and determining the trustworthiness of the user in response to the model of the user. In yet another embodiment, the step of approving further includes checking whether the item has previously been rated. In yet another embodiment, the step of approving further includes obtaining approval of the item from at least one other trustworthy user if the item has not been rated previously.

In another aspect of the invention, a system for detecting click fraud committed by a user making a request for an item on a website is provided. In one embodiment, the system includes: a data collecting module adapted to collect user data about the user from the request; a user model building module in communication with the data collecting module, the user model building module adapted to evaluate the collected user data and quantify a user trust score of the user based on the user data; a request evaluating module in communication with the user model building module, the request evaluating module adapted to determining the trustworthiness of the user based on the user trust score; and a rating management module in communication with the trust evaluating module, the rating management module adapted to update the rating of the item in response to the trustworthiness of the user, wherein the request for the item is satisfied regardless of whether the rating of the item is updated, and wherein the rating management module delays updating the rating of the item until the trustworthiness of the user is determined.

The methods are explained through the following description, drawings, and claims.

BRIEF DESCRIPTION OF THE DRAWINGS

These embodiments and other aspects of this invention will be readily apparent from the detailed description below and the appended drawings, which are meant to illustrate and not to limit the invention, and in which.

DETAILED DESCRIPTION OF THE PREFERRED EMBODIMENTS

Figure 1:
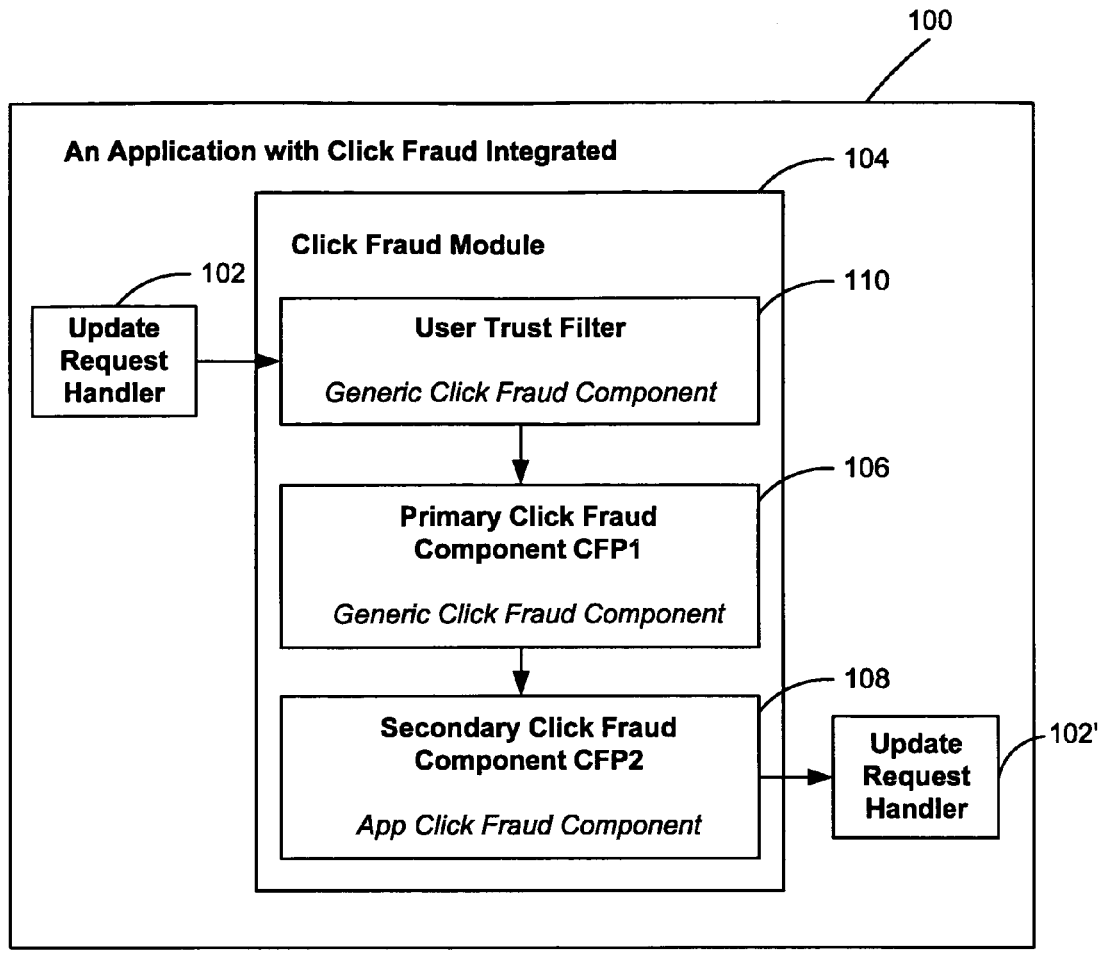
FIG. 1 is a block diagram that illustrates the various components of a system with an integrated click fraud module, in accordance with an embodiment of the invention.

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

Various forms of click fraud can be detected and prevented using the methods and systems of the present invention. The common types of click fraud include, for example, fraudulent inflation of advertisement click rates where a company or an individual seeks to fraudulently boost the number of clicks registered on its competitor's advertisements by having a person or an automated system click repeatedly on the advertisements. In a cost per click advertising model, this can result in vast increase in the advertising cost for the advertising company. A second type of click fraud that can be prevented using the disclosed methods is the fraudulent inflation of content popularity. This type of click fraud involves individuals or companies seeking to fraudulently boost the popularity of their content on various rating websites, recommendation systems or search engines. This type of activities potentially could affect the revenues earned by the rating websites, recommendation systems or search engines. More importantly, it could affect the reliability of these systems and undermine the services they provide. A third type of click fraud is the fraudulent inflation of reputation on a social network or a peer-to-peer E-commerce service site which relies on the ratings of their users. These trust ratings allow users to identify trustworthy sellers in the market place and build relationships with each other. However, the ratings can be automatically inflated or deflated leading to a loss of confidence in the trust system and therefore in the online marketplace. This type of click fraud can also be prevented using embodiments and the invention disclosed hereinafter.

In general overview, the present invention detects and prevents click fraud by identifying and allowing only trustworthy users to contribute to a content item rating where the trustworthiness of a user is determined based on his profiles and history of his interactions with the website. One important feature of the invention is the ability to identify and prevent suspicious activity such as repeated clicks before they affect a rating system. Another key feature is the requirement of support of several trustworthy users before accepting a rating for a previously unknown content item. In the preferred embodiment described below, a system of the invention first verifies user trustworthiness and then the requested content item. Nevertheless, these two verification steps can be carried out in reverse order or simultaneously, in other embodiments. As used herein, a "content item" may be a web link, an advertisement, or any other type of content vulnerable to click fraud; the "rating" of a content item may be referring to the item's click count, user rating, recommendation index or any other type of ratings associated with the item; and a "fraudulent user" may be a person, an automated script, a computer program or anything else capable of committing click fraud.

Various embodiments of this invention can be incorporated in different online systems as long as the systems maintain a profile of user activities and uniquely identify their users. For example, a web portal accessible over a mobile network is one of the ideal setups for utilizing the disclosed click fraud detection system because unique identifiers are available in the form of MSISDN and existing user profiles can be obtained from the network operator and/or service provider. Any other e-commerce system that requires users to register and create individual accounts can also provide better protection again click fraud by incorporating embodiments of the disclosed invention.

FIG. 1 is a block diagram that illustrates the various key components of a system 100 with an integrated click fraud prevention module 104. The system 100 includes an Update Request Handler 102, 102', which receives a user request for a content item through a web interface and extracts information from the request. Such information may include user session, user id, requested content item, network operator and other preferences of the website administrator. The request may be a simple HTTP request initiated by a user clicking on one of the items on a web page. It could also be in the format of a form submission. In various embodiments, the Update Request Handler 102, 102' is capable of accepting and processing requests in HTML, XHTML, WML or other similar Markup languages submitted through a web browser on a computer, a mobile phone or any other internet accessible devices.

In a system with no click fraud detection mechanisms, any user request would instantly update the internal rating of the requested content item. Even systems installed with one of the latest click fraud solutions do not prevent the ratings of the items from being updated. In contrast, the disclosed system 100, as illustrated in FIG. 1, fulfills the user's request as instantly as any other system, but delays updating the system's internal rating model for the requested content item until the request is analyzed by the Click Fraud Prevention Module 104. The Click Fraud Prevention Module 104 is adapted to monitor and halt suspicious activities before they can affect a content item's rating. As illustrated, the Click Fraud Prevention Module 104 is in communication with the Update Request Handler 102, 102' and receives extracted information from the Update Request Handler 102, 102'. The Click Fraud Prevention Module 104 further includes a User Trust Filter 110 for determining the trustworthiness of the user, a Primary Click Fraud Prevention Component 106 and a Secondary Click Fraud Prevention Component 108. After the user is determined to be trustworthy, a request for updating the rating of the content item is first stored and processed by the Primary Click Fraud Prevention Component 106 and then passed to and further processed by the Secondary Click Fraud Component 108. In general, the Primary Click Fraud Prevention Component 106 is responsible for identifying click fraud in requests for known items based on the unique identify of the user. Suspicious users and targeted content items are periodically identified, logged and fraudulent update request deleted from the list of potential updates by the Primary Click Fraud Prevention Component 106. Requests determined to be legitimate by the Primary Click Fraud Prevention Component 106 are then forwarded to the Secondary Click Fraud Component 108 for further processing and filtering. The Secondary Click Fraud Component 108 is also tasked with storing candidate updates and updating the rating in the system 100. Updated items are stored in the Secondary Click Fraud Component 108 according to a primary click fraud ID supplied by Primary Click Fraud Prevention Component 106. In another embodiment, an update request is communicated directly to both the Primary Click Fraud Prevention Component 106 and the Secondary Fraud Prevention Component 108 so that the information in both components can be updated simultaneously. An in-depth description of each component of the Click Fraud Prevention Module 104 and their respective functionalities is provided below.

User Trust Filter

In various embodiments, the Click Fraud Prevention Module requires extensive information about the user and user's request in order to build a model of the user. For example, the module may inquire about whether the user is a prepaid or a postpaid mobile customer if the request is made from a cellular phone. It may obtain data associated with a particular request, such as whether the request originates from a WAP gateway or other channels. It may also acquire session status as one way to validate the request. All the data are associated with user making the request and are used to quantify an overall trust level of the user for determining whether his request is fraudulent.

The User Trust Filter component is responsible for building a model of the user and determining the trustworthiness of the user based on the information received from the Update Request Handler. Users deemed trustworthy are allowed to contribute to the update process but are subjected to further scrutiny. Certain preconditions must be met before trust can be determined. In order for an update request to be processed, the user must have a valid user model accessible by the Click Fraud Prevention Module. The model may be in the form of an object, an entry in a database, or an interaction history log stored on the system.

In addition, the user's trustworthiness can also be affected by whether or not the update request originated from a valid current session. Most web-based content systems, such as a search engine, maintain such information for the duration of the user's session to allow easy and quick access to information on the systems. An update request without an associated live session is often more suspect than one with a valid session. In one embodiment of the invention, to acquire a valid session the user must first issue a request to the system and then click on one of the proffered items. Requests for updates are not honored if they occur outside a valid current session. Some valid update requests may necessarily fail this test due to session timeouts. However, these should only account for a small number of all user requests and may be reconsidered once the user starts another valid session. It is worth noting that the user trust model is not based solely on the requested content item, but rather based on the total browsing pattern of the user on the website where the content is available and associated with a rating.

The suggested formula for combining trust factors to build the user model is flexible and may be customized based on the type of click fraud targeted, the platform on which the system is running, and a number of other factors. One embodiment of the formula, as shown below, combines the required factors with weighted non-required factors.

$$\text{User Trust Score} = (\text{Product of Required Factors}) * (\text{Sum of Weighted Non-Required Factors})$$

According to the formula, if a user fails one of the required factors he will receive a User Trust Score of 0 and, therefore, is deemed untrustworthy. In contrast, if the user fails one of the non-required factors his User Trust Score will only be degraded based on the weight of that failed factor and his request may still receive a sufficient User Trust Score to pass the User Trust Filter. Variations of the formula are described in detail below to illustrate the different embodiments of the User Trust Filter.

The following example is designed specifically for a website hosted by a mobile portal operator and the requests in question are user clicks on items (e.g., URLs or ads) that are directed to premium content on the portal. However, the principles involved are generally applicable to content provision systems such as search engines, web portals and recommendation systems. A basic scheme is shown in the formula below where each criterion represents a different dimension in the user's trust model. To determine the trustworthiness of the user, each criterion is weighted according to its relative importance by respective numerical factors A-J:

User Trust Score =
(A*User Contract Score)*(B*Identical Profile Score)*
(C*Purchase History Score)*(D*Registered User Score)*
(E*User Voice Calls)*(F*Valid User Phone Number)*
(G*User Gateway Score)*(H*User Agent Score)*
(I*User Hit Time Ratio)*(J*UCP Age Score)

As shown in the formula, criteria are combined multiplicatively to give a final trust score for the user. It is also possible to make some of the criteria into requirements using Boolean operators, examples of which are provided below in the discussion of each individual score in the formula. Alternatively, instead of combining all the criteria, the minimum score achieved by the user can be chosen to influence the level of trust the system places in him.

In this formula, User Contract Score (UCS) is determined by whether the user has a prepaid contract or a postpaid contract. Due to the disposable nature of prepaid phones, prepaid users are deemed less trustworthy as a source of rating updates. The UCS could be used to reduce the trust placed in prepaid users by an operator defined factor (e.g., prepaidPenaltyFactor):

UCS=1/prepaidPenaltyFactor

For example, if the prepaidPenaltyFactor is 2, the over all trust score of the user is halved if the user is a prepaid user. In the Boolean operator embodiment, the User Contract Score (UCS) equals to 1 if the user is a postpaid user and 0 otherwise. Thus, all prepaid users will always have a zero overall trust score regardless of their scores in the other criteria. They are deemed not trustworthy and not permitted to update the content rating system.

Because it is highly unlikely that two or more users will have identical profiles, any such users are immediately be suspected to be a fraudulent user for generating repeated clicks. The Identical Profile Score (IPS) of a user is calculated based on the degree of overlap between his profile and another user's profile. Some overlap will inevitably occur and therefore a threshold at which this overlap becomes suspicious is defined by the system. For example, if the percentage overlap of current user profile with another user's profile is denoted as PO, the Identical Profile Score (IPS) is set to 1 if the percentage overlap (PO) is less than a predefined threshold and 0 if over the threshold. Accordingly, a user having a profile closely resembling another profile would be disqualified from updating the rating system.

Users having a history of making purchases online are most likely to be legitimate human users rather than fraudulent users and thus are inherently more trustworthy. The Purchase History Score (PHS) rates a user's trustworthiness based on the number of purchases he makes. The system may define a purchase threshold (e.g., a minimum of three purchases) and calculate the user's Purchase History Score (PHS) by dividing the number of past purchases by the threshold number. Because purchases are relatively uncommon, one purchase may be sufficient to ensure a non-fraudulent user. An operator defined constant (e.g., 0.5 in the PHS formula below) may be added to the number of past purchases to threshold ratio to make the absence of a purchase a weak indicator of potential fraud. If the user's purchases exceed this threshold, his Purchase History Score (PHS) has a value of 1 so as to normalize PHS between 0 and 1:

PHS=Min{1,0.5+numPuchases/threshold}

Moreover, registered users are accorded a higher level of trust than those who have not. The Registered User Score (RUS) is set to 1 if user is registered and 0 otherwise. Alternatively an operator defined factor (unregisteredUserPenaltyFactor) may determine the effect of not registering has on the user's trustworthiness:

RUS=1/unregisteredUserPenaltyFactor

A user making voice calls from his mobile phone is awarded a higher level of trust because voice calls are not usually made by fraudulent users. The User Voice Calls Score (UVCS) may be defined as a Boolean requirement which would block users not having made voice calls from update the content ratings. Alternatively, an operator defined factor (nonVoiceUserPenaltyFactor) could be used to determine the effect of having a history of making voice calls has on user trustworthiness:

UVCS=1/nonVoiceUserPenaltyFactor

Users communicating via a WAP gateway may be given a higher level of trust than those entering the portal through other means because it is more difficult to generate fraudulent clicks using the web interface on a mobile device. By contrast, non-WAP gateway, such as a LAN or WAN network, is more open to abuse by click simulating programs which can be easily installed on regular PCs that are usually connected to these types of network. The User Gateway Score (UGS) may be defined as a Boolean requirement so that the User Gateway Score (UGS) is 1 for users using a WAP gateway and 0 otherwise. Alternatively, an operator defined factor (gatewayPenaltyFactor) can be used to determine the effect of the type of gateways has on user trustworthiness:

UGS=1/gatewayPenaltyFactor

User requests issued using a valid user agent such as a Nokia phone may be given a higher level of trust than requests coming from a PC based internet browser (e.g., Internet Explorer) or similar non-mobile user agents that are more likely to be used by a fraudulent user. The User Agent Score (UAS) may be defined as a Boolean requirement where, for example, UAS is 1 if the user agent is a branded mobile device and 0 for other types of devices. Alternatively, an operator defined factor (UserAgentPenaltyFactor) may be used to determine the effect this has on user trustworthiness:

UAS=1/UserAgentPenaltyFactor

Fraudulent users are often automated to repeatedly click on advertisements or URLs on websites. Thus, another factor in determining the user's trustworthiness is based on the average number of hits on the portal during one session. This number can be calculated from the user's first access time (FAT), last access time (LAT) and the number of portal nodes (NN) visited in between, as follows:

ProfileAge=LAT−FAT aveusage=NN/profileAge

As used herein, the term "user community preference" (UCP) refers to a type of user profile that defines the relative strength of user interests in various topics. UCPs leverage the structured browsing history, habits of users and categorization inherent in portal structures to build a holistic view of user interests. The UCP Age Score (UCPS) is 0 if avgUsage is greater than an operator specified acceptable use limit (aveUseLimit). Alternatively, the UCP Age Score is 1 if profileAge is greater than an operator specified minimum profile age limit (profileAgeLimit). This way, users that generate repeat clicks in a short time will not be able to update content ratings.

The factors used in determining the trustworthiness of a user are not limited to the ones discussed above. Variations of the formula may include or omit one or more of the individual scores, depending on the customization of the system. Other types of formulas incorporating user data may also be used. For example, the final User Trust Score can also be calculated as a weighted sum where the relative importance of each of the individual scores adds to 100%. An example using weighted sum is given below:

$$\text{User Trust Score} = (A * \text{user contract score}) +$$
$$(B * \text{identical profile score}) + (C * \text{purchase history score}) +$$
$$(D * \text{registered user score}) + (E * \text{user voice calls score}) +$$
$$(F * \text{valid user phone number}) + (G * \text{user gateway score}) +$$
$$(H * \text{user agent score}) + (I * \text{user hit time ratio}) * (J * UCP \text{ age score})$$

where A, B, C, D, E, F, G, H, I and J represent the relative importance of user contract score, identical profile score, purchase history score, registered user score, user voice calls score, valid user phone number, user gateway score, user agent score, user hit time ratio and UCP age score, respectively. Once the User Trust Score is obtained by applying the formula to the user's trust model, the user's trustworthiness is determined by comparing the User Trust Score with a pre-defined minimum score required for rating updates.

Primary Click Fraud Prevention Component

Figure 2:
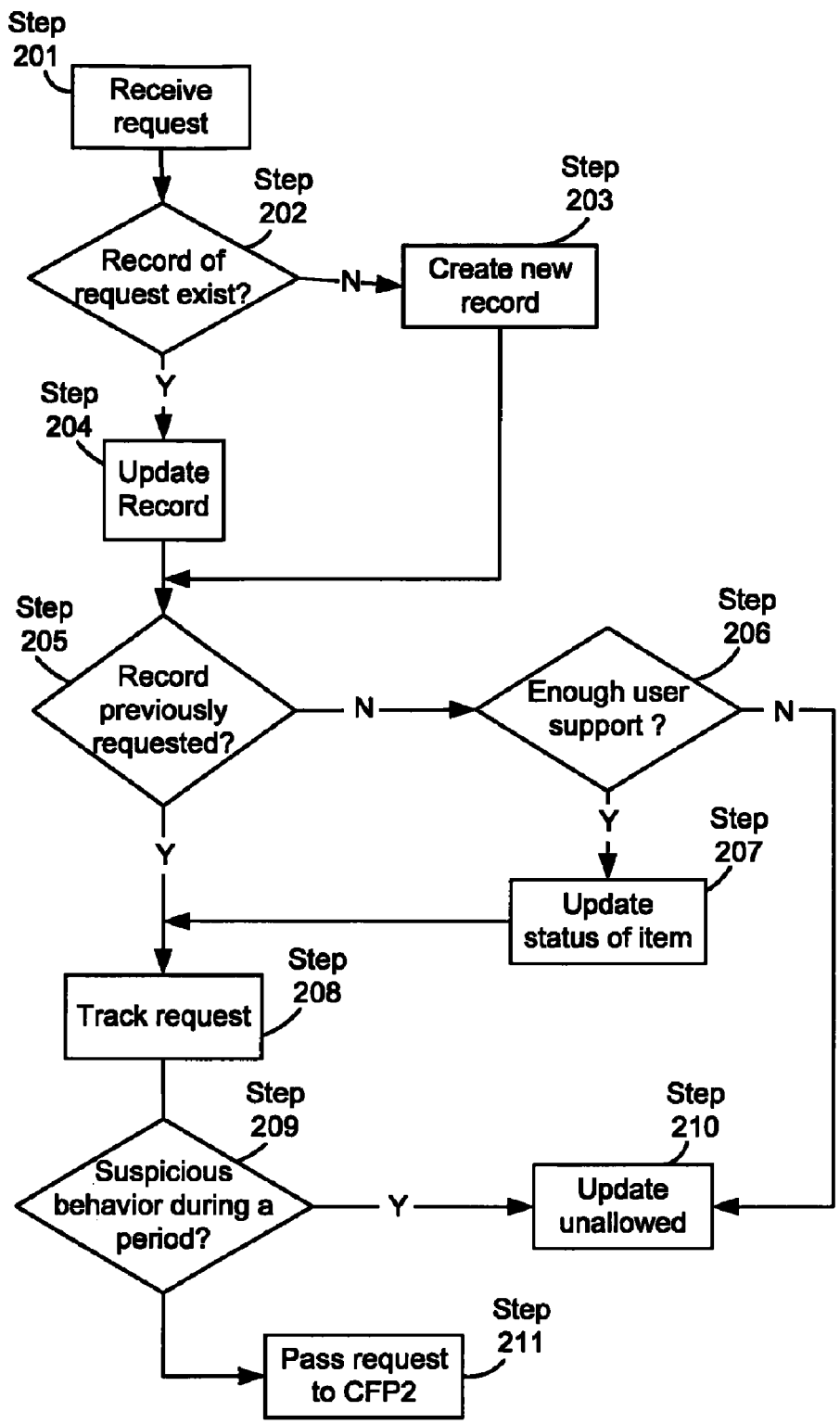
FIG. 2 is a flow chart that illustrates the steps in an exemplary process performed by a click fraud prevention module, in accordance with an embodiment of the invention.

Once a user is deemed trustworthy based on final User Trust Score, his request is forwarded to the Primary Click Fraud Prevention Component. Referring to FIG. 2, upon receiving the request (step 201), Primary Click Fraud Prevention Component first checks if it already has a record of the request (step 202). If no record is found, a new record is created in Primary Click Fraud Prevention Component (step 203). Table 1 shows an example of the format in which records are kept in Primary Click Fraud Prevention Component. Typically, the record includes a unique identifier for the request (i.e., CFC_ID in Table 1), the user ID (e.g., Mobile Station Integrated Services Digital Network (MSISDN) in Table 1) of the user, the ID of the requested content item (i.e., CFC_URL_ID in Table 1), the time of first click on the item (i.e., FirstHit in Table 1), the time of the last click of the item (i.e., LastHit in Table 1), cumulative hits count of the item (i.e., Hitscount in Table 1), and whether the content item is previously known (i.e., Known in Table 1). If there is already a record for this request in Primary Click Fraud Prevention Component, the click count of the item in the record is incremented by one and the last hit time is also updated to be the time of the latest request (step 204).

TABLE 1

Sample Request Table in the Primary Click Fraud Prevention Component

| CFC_ID | MSISDN | CFC_URL_ID | FirstHit | LastHit | Hitscount | Known |
|--------|--------|------------|----------|---------|-----------|-------|
| 22 | 3456 | 100 | 02:15 | 03:17 | 1000 | T |
| 23 | 3456 | 101 | 02:20 | 05:30 | 200 | F |
| 24 | 2345 | 101 | 12:00 | 17:00 | 5 | F |
| 25 | 2345 | 102 | 12:40 | 13:00 | 2 | T |
| 26 | 2346 | 101 | 12:42 | 12:50 | 3 | F |
| 27 | 2347 | 101 | 11:20 | 13:20 | 5 | F |

Next, the Primary Click Fraud Prevention Component verifies whether the content item has previously been requested or "known" to the system (step 205). If the item has not been previously accepted by the system, the item has to be approved before the system updates the item's rating (step 206). In one embodiment, approval can be gained based on the fact the item has been requested by multiple users. An operator defined Concurring User Count (OCU) sets out the number of users who must agree in order for an item to be promoted. In the example set out in Table 1, users 2345, 2346, and 2347 all clicked on CFC_URL_ID 101 which was previously unknown as indicated by the "F"s in the "Known" column. If the Concurring User Count (OCU) is 2, the requests for CFC_URL_ID 101 would be transferred to the Secondary Fraud Prevention Component for potential rating update because the number of users having requested it is 3, over the threshold. Once the candidate item gains sufficient support from multiple users, records of all the users who have requested the item are updated. For example, CFC_IDs 24, 26 and 27 in Table 1 would be updated to have "T" in the "Known" field. In addition, the candidate item is recorded by the Primary Click Fraud Prevention Component as a previously accepted item and will be subject to the tests required for such content as discussed in the next paragraph (step 207).

For items previously "known" to the system, the Primary Click Fraud Prevention Component keeps a record of user requests of them in a table (step 208) instead of instantly updating their ratings. An example can be found in Table 1 where user 2345 clicked on a previously known item identified by CFC_URL_ID 102. If the user makes further update requests on the same item, the record CFC_ID 25 will be updated accordingly. The record in the table can then be used to indicate suspicious behavior (step 209). If a user requests more than a pre-defined number of clicks in a period it is likely that his activity is suspicious and may be fraudulent, and the system automatically reports the user to the network operator and disallows his update requests (step 210). The time period in question may be determined by the system operator, as is the upper bound on the number of update requests. In this example shown in Table 1, assuming an operator defined time period and a limit on the number of hits per period are defined as follows:

Operator defined time period (OT)=60 mins
Operator defined hits limit per OT (OHPT)=10

Figure 3:
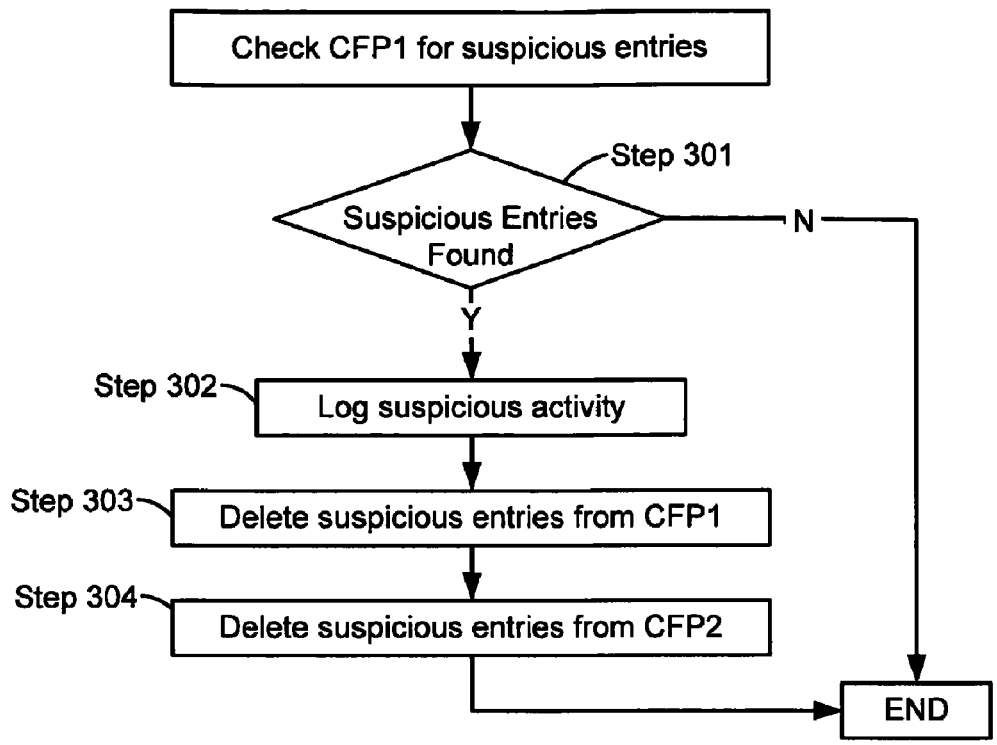
FIG. 3 is a flow chart that illustrates the steps of an offline process for detecting suspicious entries, in accordance with an embodiment of the invention.

Accordingly, the allowed number of hits per minute is 0.16. User 3456 had 1000 hits on CFC_URL_ID 100 in 62 minutes, an average of 16 hits per minute, and 200 hits on CFC_URL_ID 101 in 190 minutes, an average of 1.05 hits per minute, both averages exceeding the 0.16 hits per minute limit defined by the system. Accordingly, user 3456 is determined to be suspicious. His hits are removed from the table and he is noted in the click fraud log as a fraudulent user. Users 2345, 2346, and 2347 by contrast have not exceeded the operator defined limits and, thus, their update requests remain. FIG. 3 illustrates the above process for detecting fraudulent update requests. Upon detecting a suspicious entry (step 301), the Click Fraud Prevention Module records it in a log and deletes it from both the Primary Click Fraud Prevention Component and the Secondary Click Fraud Prevention Component (steps 302, 303, 304).

Figure 4:
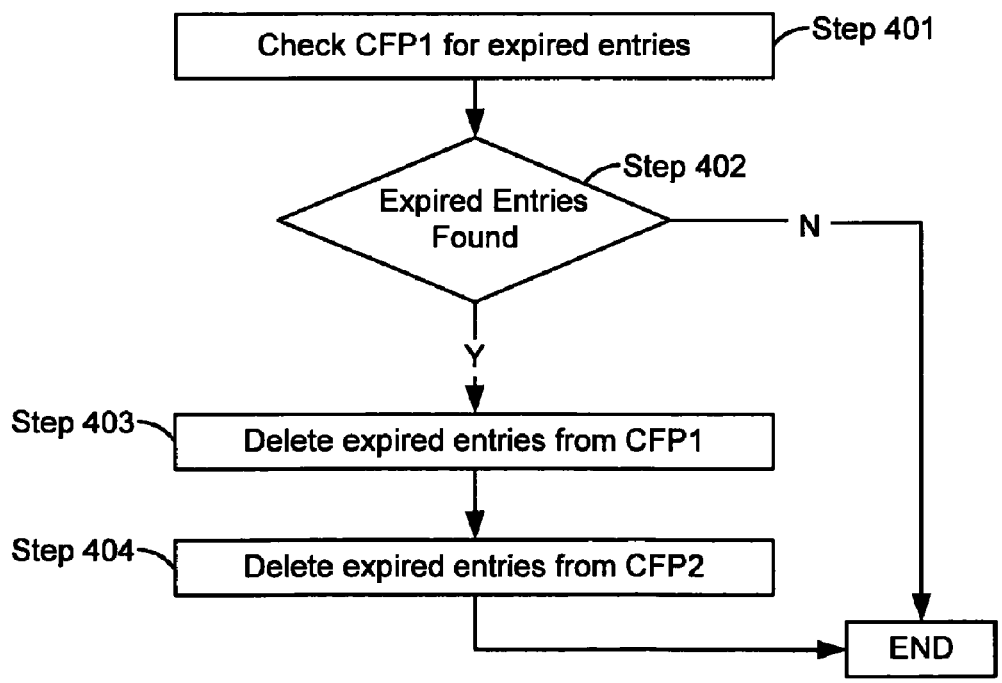
FIG. 4 is a flow chart that illustrates the steps of an offline process for deleting expired content from a click fraud prevention module, in accordance with an embodiment of the invention.

In addition, before the rating of an item can be updated, the Primary Click Fraud Component checks to see if the item has expired for being inactive for an extended period of time. Consequently, if an item has not been requested within a fixed time period, it is removed from the Primary Click Fraud Prevention Component. This frequently occurs for previously unknown items which require several users to click on them during the same period to be approved. Any item whose LastHit property exceeds the operator defined expireAge (OEA) is deleted from the Primary Click Fraud Prevention Component. The Secondary Click Fraud Module is then informed so that it can delete the expired items from its data store. FIG. 4 illustrates this offline process for deleting an expired item from the Click Fraud Prevention Module. The process includes the step of searching for any expired items based on the time they are last requested (step 401). If an item has been inactive for more than a predetermined time period (step 402), its record is deleted from both the Primary Click Fraud Prevention Component and the Secondary Click Fraud Module of the Click Fraud Prevention Module (respectively, steps 403, 404).

Since candidate items are periodically deleted when their ages exceed a predefined time period support from multiple users must occur within a certain timeframe for their requests to have a potential effect on the items' ratings. The predefined time period may be specified by the system operator as Operator-defined Review Period (ORP). Each time this period elapses, the system performs the scheduled checks for expired items, acceptable items and evidence of click fraud. Secondary Click Fraud Prevention Component After the preliminary processing by the Primary Click Fraud Prevention Component, the update requests are forwarded to the Secondary Click Fraud Module so that all the data necessary for an update can be stored. The Secondary Click Fraud Module is effectively a staging area for accumulating data until the validity of a request can be determined. Only then, is the request forwarded to the host system and executed. In contrast, if the request is invalid, it is logged by the click fraud prevention module and no update is performed by the host system. Unlike the Primary Click Fraud Prevention Component, the Secondary Click Fraud Module is by necessity customized to the host system because the Secondary Click Fraud Module must replicate the update mechanism of the host system where the click fraud component is installed. For example, some host systems use a User ID and Content Item ID pair to identify a rating update request. A host system that is a search system may also require that the search query be recorded. Other host systems rely on community IDs instead of individual IDs. Yet other host systems do not require any type of IDs so that the updates are completely anonymous. Accordingly, the database on the Secondary Click Fraud Module has to be customized to store the essential information to be used in updating the corresponding host system.

Table 2 shows an example of the format in which records are kept in the database on the Secondary Click Fraud Module. Typically, each record includes a unique identifier (i.e., ClickFraudID in Table 2), a query ID (e.g., QUERYID in Table 2) identifying the query generating the clicked item, a category ID of the content item (i.e., CAT_ID in Table 2), an item ID (i.e., URL_ID in Table 2), an item type ID (i.e., URL_TYPE_ID in Table 2), time of first click (i.e., FIRST_HIT in Table 2), time of last click (i.e., LAST_HIT in Table 2), a click count (i.e., HITS_COUNT in Table 2) indicating the number of times the item has been clicked on and a unique user ID (i.e., MSISDN in Table 2).

TABLE 2

Click Fraud Hits Table in the Secondary Click Fraud Module

| ClickFraudID | QUERY_ID | CAT_ID | URL_ID | URL_TYPE_ID | FIRST_HIT | LAST_HIT | HITS_COUNT | MSISDN |
|---|---|---|---|---|---|---|---|---|
| | 200 | 17 | 100 | 1 | 02:15 | 03:17 | 1000 | 3456 |
| | 200 | 10 | 100 | 1 | 02:20 | 05:30 | 200 | 3246 |
| | 201 | 17 | 101 | 1 | 12:00 | 17:00 | 5 | 1234 |
| | 201 | 17 | 101 | 1 | 13:45 | 13:45 | 2 | 5678 |
| | 201 | 17 | 101 | 1 | 13:25 | 13:35 | 10 | 4321 |

In one embodiment, the Primary Click Fraud Prevention Component sends three types of requests to the Secondary Click Fraud Module: item update request, deletion request, and acceptable candidate check. Specifically, if the Primary Click Fraud Prevention Component detects click fraud or simply decides that an item has expired, it passes the URL_ID on to the Secondary Click Fraud Module with a deletion request so that the item can be deleted from the Secondary Click Fraud Module. If the Primary Click Fraud Prevention Component identifies suitable items for update, a list of the URL_IDs identifying the items is passes to the Secondary Click Fraud Module with an acceptable candidate check request for possible rating update. The Secondary Click Fraud Module then checks its own internal rules to determine if the update should occur. When an item is successfully updated, it is deleted from both the Primary Click Fraud Prevention Component and the Secondary Click Fraud Module.

Figure 5:
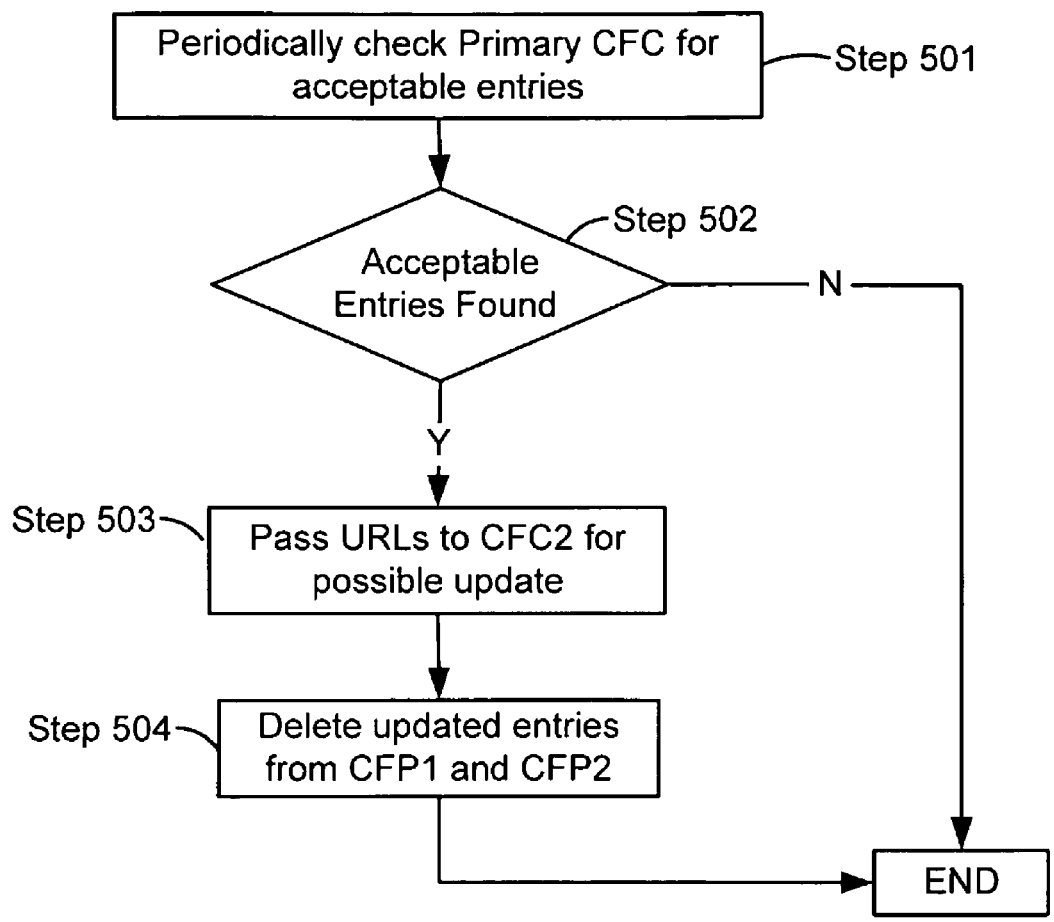
FIG. 5 is a flow chart that illustrates the steps of an offline process for updating acceptable content, in accordance with an embodiment of the invention.

The basic steps in the process for managing acceptable updates are illustrated in FIG. 5. The process starts by the Secondary Click Fraud Module periodically checking the Primary Click Fraud Prevention Component for accepted entries (step 501). If acceptable entries are found (step 502), the items in the Primary Click Fraud Prevention Component are passed to the Secondary Click Fraud Module for possible update (step 503) and deleted from the Primary Click Fraud Prevention Component and the Secondary Click Fraud Module once the update completes (step 504).

However, it is not guaranteed that an item forwarded to the secondary component will be updated since the internal rules of the secondary component may place further constraints. For example, in one embodiment, it is not enough that an item is requested by multiple users. The Secondary Click Fraud Module may further require that the users must also have issued the same or similar queries that generate a number of items from which they each selected the same item. An operator defines concurringUserCount (OCU) sets out the number of users who must agree in order for an item to be promoted. In the example set out in the CIS tables above, users 1234, 4321 and 5678 all clicked on URL_ID 101 for QUERY_ID 201. If the OCU is 2, these hits are transferred to a main database. This more demanding checking process put a higher level of burden of proof on item promotions in that individual users must have used identical queries and then selected the same item.

These conditions could be relaxed however by allowing users with similar queries to act as concurring users. For example, if user A submitted "galway horse races" as a query and clicked on galway.com in the results list and user B submitted "galway" and also clicked on galway.com as a result, these users should both be able to contribute support to the website galway.com, passing the click fraud filter. Therefore, a click fraud similar query threshold (CF_SimQ) can be defined to set the level at which queries can support each other. For previously known items, the Secondary Click Fraud Module identify previously occurring items and queries and update their hit counts.

Any hit request that makes it past CFP is deemed to be a non-fraudulent hit and is forwarded to a main database. New IDs for query, URL are obtained to maintain consistency with the main database, but all required information is available in the temporary click fraud database tables in the Primary Click Fraud Prevention Component and/or the Secondary Click Fraud Module. In one embodiment, the Secondary Click Fraud Module essentially maintains all the data necessary to update the main database. As discussed above, the Secondary Click Fraud Module aggregates all the valid update requests for an item and forwards one update request for the item to the main database to be updated. That is, all individual hits accrued by each MSISDN are merged to give a final hit count for groups of users with identical preferences for the requested item. The main database stores the rating associated with each item. Upon receiving the aggregated request for an item, the rating of the item is updated (e.g., the click count of the item is increased by the number equivalent to the final hit count).

Embodiments of the invention build a trust model for each individual user and holds each click in probation until the system identifies the click is either fraudulent or until the click request passes all click fraud filters. In the former case, the click request is deleted and the user id noted while in the latter the request is honored as a legitimate request. This trust model is based on a variety of factors as discussed above. It requires groups of trustworthy users to concur on a new item before tracking its rating in the system. It also monitors rates of received hit requests and prevent over frequent hit request.

This invention can be used in any system where users' clicks are recorded and where there exists a unique identifier (e.g., MSISDN). Mobile is the ideal environment for this because there is each access to the users' unique identifier and their context. However, this is not entirely unique to the mobile environment as this approach can be applied to other websites that maintain individual user profiles (e.g, a structured portal with a login). The method can be applied to systems which promote content, advertisements, recommendations, and other users.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method comprising the steps of:
receiving by selection of a web link, via a computer processor, a request for an item on a website;
directing a user to the requested item but delaying a rating update of the requested item;
collecting numerical data associated with the user to build a model of the user representing a user trust score for the user;
building the model of the user in response to the collection of the numerical data;
determining a trustworthiness of the user in response to the model of the user; and
once the user is determined trustworthy based on the user trust score, forwarding the user's request for the item to a primary click fraud prevention component, the primary click fraud prevention component checking for a record of the user's request in a request table containing a plurality of records of user requests for a plurality of users, each request record in the request table associated with a unique request identifier, a unique user identifier of the requesting user, an identifier of the requested item, a time of a first selection of the requested item, a time of the last selection of the requested item, a cumulative hits count of the requested item, and an indicator of whether the requested item has previously been accepted in response to a number of requests for the item meeting a predefined threshold to indicate that the rating of the requested item is allowed to be updated in response to the trustworthiness of the user;
wherein before the rating of the requested item is updated in response to the trustworthiness of the user, the primary click fraud prevention component checks the request table to see whether the requested item has expired for not having been requested within a fixed time period, and removes the requested item from the request table of the primary click fraud prevention component if the requested item has not been requested within the fixed time period;
wherein the rating of the requested item is updated in response to the trustworthiness of the user and a determination that the requested item has not expired.

2. The method of claim 1 wherein click fraud is an inflation of advertisement clicks on the requested item.

3. The method of claim 1 wherein click fraud is an inflation of popularity of the requested item.

4. The method of claim 1 wherein click fraud is an inflation of reputation of the requested item.

5. The method of claim 1 wherein the user is identified by the unique user identifier associated with the user.

6. The method of claim 1 wherein the step of collecting numerical data to build a model of the user comprises the step of collecting data including an identical profile score, a purchase history score, a registered user score, a user gateway score, a user agent score, a user hit time ratio, and a user community preference (UCP) age score.

7. The method of claim 6 wherein the step of building the model of the user comprises the step of calculating the value:
the user trust score =(A*the identical profile score)*(B*the purchase history score)*(C*the registered user score)*

(D*the user gateway score)*(E*the user agent score)*(F*the user hit time ratio)*G*the UCP age score), wherein A, B, C, D, E, F, and G are numerical factors used in the calculation to weight the identical profile score, the purchase history score, the registered user score, the user gateway score, the user agent score, the user hit time ratio and the UCP age score, respectively, according to a relative importance between the identical profile score, the purchase history score, the registered user score, the user gateway score, the user agent score, the user hit time ratio and the UCP age score.

8. The method of claim 1 wherein the step of collecting numerical data to build a model of the user comprises the step of collecting data including a user contract score, an identical profile score, a purchase history score, a registered user score, a user voice calls score, a valid user phone number, a user gateway score, a user agent score, a user hit time ratio, and a user community preference (UCP) age score.

9. The method of claim 8 wherein the step of building the model of the user comprises calculating the value:

the user trust score =(A*the user contract score)*(B*the identical profile score)*(C*the purchase history score)*(D*the registered user score)*(E*the user voice calls score)*(F*the valid user phone number)*(G*the user gateway score)*(H*the user agent score)*(I*the user hit time ratio)*(J*the UCP age score), wherein A, B, C, D, E, F, G, H, I and J are numerical factors used in the calculation to weight the user contract score, the identical profile score, the purchase history score, the registered user score, the user voice calls score, the valid user phone number, the user gateway score, the user agent score, the user hit time ratio and the UCP age score, respectively, according to a relative importance between the user contract score, the identical profile score, the purchase history score, the registered user score, the user voice calls score, the valid user phone number, the user gateway score, the user agent score, the user hit time ratio and the UCP age score.

10. The method of claim 8 wherein the user contract score is inversely proportional to a prepaid penalty factor.

11. The method of claim 8 wherein the user contract score is 1 for postpaid users and 0 for prepaid users.

12. The method of claim 8 wherein the identical profile score is 1 if a degree of overlap between a profile of the user and another profile is less than a predefined threshold and 0 if otherwise.

13. The method of claim 8 wherein the purchase history score is:

Min {1, C +number of past purchases by the user/a predefined purchase threshold}, wherein C is a constant, and wherein the predefined purchase threshold is a minimum number of purchases.

14. The method of claim 8 wherein the registered user score is inversely proportional to an unregistered user penalty factor.

15. The method of claim 8 wherein the registered user score is 1 for a registered user and 0 for an unregistered user.

16. The method of claim 8 wherein the user voice calls score is inversely proportional to a non-voice user penalty factor.

17. The method of claim 8 wherein the user voice calls score is 1 for a user having made voice calls and 0 for a user who has not made voice calls.

18. The method of claim 8 wherein the valid user phone number is inversely proportional to an invalid phone number penalty factor.

19. The method of claim 8 wherein the valid user phone number is 1 for a user with a valid user phone number and 0 for a user without a valid phone number.

20. The method of claim 8 wherein the user gateway score is inversely proportional to an invalid phone number penalty factor.

21. The method of claim 8 wherein the user gateway score is 1 for a user connected through a wireless application protocol (WAP) gateway and 0 for a user not connected through a WAP gateway.

22. The method of claim 8 wherein the user agent score is inversely proportional to a user agent penalty factor.

23. The method of claim 8 wherein the user agent score is 1 for a user using a valid user agent and 0 for a user using an invalid user agent.

24. The method of claim 8 wherein the user hit time ratio is higher for a user having a lower hit per time period number.

25. The method of claim 8 wherein the UCP age score is NN/(LAT-FAT), wherein NN is a number of nodes of a portal visited by the user where the portal is a web portal having the requested item, LAT is a last access time of the user to the portal, and FAT is a first access time of the user to the portal.

26. The method of claim 8 wherein the UCP age score is 0 if NN/(LAT-FAT) is greater than an average use limit and 1 if LAT-FAT is greater than a defined limit, wherein NN is a number of nodes of a portal visited by the user where the portal is a web portal having the requested item, LAT is a last access time of the user to the portal, and FAT is a first access time of the user to the portal.

27. The method of claim 8 wherein the step of building the model of the user comprises calculating the value:

the user trust score =(A*the user contract score)+(B*the identical profile score)+(C*the purchase history score)+(D*the registered user score)+(E*the user voice calls score)+(F*the valid user phone number)+(G*the user gateway score)+(H*the user agent score)+(I*the user hit time ratio)+(J*the UCP age score), wherein A, B, C, D, E, F, G, H, I and J are numerical factors used in the calculation to weight the user contract score, the identical profile score, the purchase history score, the registered user score, the user voice calls score, the valid user phone number, the user gateway score, the user agent score, the user hit time ratio and the UCP age score, respectively, according to a relative importance between the user contract score, the identical profile score, the purchase history score, the registered user score, the user voice calls score, the valid user phone number, the user gateway score, the user agent score, the user hit time ratio and the UCP age score.

28. The method of claim 1 wherein in order for an update request to update to the rating of the item to be processed the model of the user must be valid and accessible.

29. The method of claim 1 wherein the trustworthiness of the user is affected by whether or not an update request to update the rating of the requested item originated from a valid current session, such that to acquire the valid current session the user must first issue a request to a system and then select one of a plurality of proffered items, where the update request is not honored if the update request occurs outside of the valid current session.

30. The method of claim 1 wherein the user is determined to be not trustworthy, and the user's requests are removed from the request table and the user is noted in a click fraud log as a fraudulent user, if any of the records in the request table associated with the user's unique user identifier indicate a number of hits per minute exceeding a predefined allowed number of hits per minute, where the hits per minute indicated by a record is calculated based on the record's associated cumulative hits count of the item by the user and a difference between the record's associated time of a first selection of the item and the record's associated time of the last selection of the item.

31. A method comprising the steps of:

detecting, by a computer processor, an action of a user on an item; and once the user is determined trustworthy based on a user trust score, forwarding the user's action on the item to a primary click fraud prevention component, the primary click fraud prevention component checking for a record of the user's action on the item in a request table containing a plurality of records of user actions for a plurality of users, each action record in the request table associated with a unique action identifier, a unique user identifier of the user, an identifier of the item for which the action is detected, a time of a first selection of the item for which the action is detected, a time of a last selection of the item for which the action is detected, a cumulative hits count of the item for which the action is detected, and an indicator of whether the item for which the action is detected has previously been accepted in response to a number of requests for the item meeting a predefined threshold to indicate that a rating of the requested item is allowed to be updated in response to the trustworthiness of the user;

wherein before the rating of the item is updated in response to the trustworthiness of the user, the primary click fraud prevention component checks the request table to see whether the item has expired for not having been requested within a fixed time period, and removes the requested item from the request table of the primary click fraud prevention component if the item has not been requested within the fixed time period;

wherein updating the rating of the item is withheld in response to the action until the user is determined to be trustworthy and it is determined that the item has not expired.

32. The method of claim 31 further comprising the steps of:

collecting numerical data associated with the user to build a model of the user representing the user trust score for the user;

building the model of the user in response to the collection of the numerical data by; and determining the trustworthiness of the user in response to the model of the user.

33. The method of claim 31 further comprising the steps of obtaining approval of the item by determining that the item for which the action is detected has previously been accepted, before updating the rating associated with the item in response to the action.

34. The method of claim 31 wherein the user is identified by the unique user identifier associated with the user.

35. A method comprising the steps of:

receiving by selection of a web link, via a computer processor, a request for an item on a website;

approving the requested item for a rating; and once the user is determined trustworthy based on a user trust score, forwarding the user's request for the item to a primary click fraud prevention component, the primary click fraud prevention component checking for a record of the user's request in a request table containing a plurality of records of user requests for a plurality of users, each request record in the request table associated with a unique request identifier, a unique user identifier of the requesting user, an identifier of the requested item, a time of a first selection of the requested item, a time of the last selection of the requested item, a cumulative hits count of the requested item, and an indicator of whether the requested item has previously been accepted in response to a number of requests for the item meeting a predefined threshold to indicate that the rating of the requested item is allowed to be updated in response to the trustworthiness of the user;

wherein before the rating of the requested item is updated in response to the trustworthiness of the user, the primary click fraud prevention component checks the request table to see whether the item has expired for not having been requested within a fixed time period, and removes the requested item from the request table of the primary click fraud prevention component if the item has not been requested within the fixed time period;

wherein updating the rating of the requested item in response to the user request is withheld until the user is determined to be trustworthy and it is determined that the requested item has not expired.

36. The method of claim 35 further comprising the steps of:

collecting numerical data associated with the user to build a model of the user representing the user trust score for the user;

building the model of the user in response to the collected data; and determining the trustworthiness of the user in response to the model of the user.

37. The method of claim 35 wherein the step of approving further comprises the step of checking whether the requested item has previously been rated.

38. The method of claim 37 wherein the step of approving further comprises the step of obtaining approval of the requested item if the requested item has not been rated previously, by determining that the requested item has previously been accepted.

39. A system comprising:

a computer processor configured for:

receiving by selection of a web link, via a computer processor, a request for an item on a website;

directing a user to the requested item but delaying a rating update of the requested item;

collecting numerical data associated with the user to build a model of the user representing a user trust score for the user;

building the model of the user in response to the collection of the numerical data;

determining a trustworthiness of the user in response to the model of the user; and once the user is determined trustworthy based on the user trust score, forwarding the user's request for the item to a primary click fraud prevention component, the primary click fraud prevention component checking for a record of the user's request in a request table containing a plurality of records of user requests for a plurality of users, each request record in the request table associated with a unique request identifier, a unique user identifier of the requesting user, an identifier of the requested item, a time of a first selection of the requested item, a time of a last selection of the requested item, a cumulative hits count of the requested item, and an indicator of whether the requested item has previously been accepted in response to a number of requests for the item meeting a predefined threshold to indicate that the rating of the requested item is allowed to be updated in response to the trustworthiness of the user;

wherein before the rating of the requested item is updated in response to the trustworthiness of the user, the primary click fraud prevention component checks the request table to see whether the requested item has expired for not having been requested within a fixed time period, and removes the requested item from the request table of the primary click fraud prevention component if the item has not been requested within the fixed time period wherein the rating of the requested item is updated in response to the trustworthiness of the user and a determination that the requested has not expired.

* * * * *

UNITED STATES PATENT AND TRADEMARK OFFICE
CERTIFICATE OF CORRECTION

PATENT NO. : 8,135,615 B2  
APPLICATION NO. : 12/002576  
DATED : March 13, 2012  
INVENTOR(S) : Bradley et al.

Page 1 of 1

It is certified that error appears in the above-identified patent and that said Letters Patent is hereby corrected as shown below:

In the claims:
Claim 7, col. 15, line 2; please replace "(F*the user hit time ratio)*G*the UCP age score)," with --(F*the user hit time ratio)*(G*the UCP age score),--.

Signed and Sealed this  
Twelfth Day of March, 2013

Teresa Stanek Rea  
*Acting Director of the United States Patent and Trademark Office*